United States Patent [19]
Wahi et al.

[11] 4,039,906
[45] Aug. 2, 1977

[54] VARIABLE CAPACITOR

[75] Inventors: Chander M. Wahi; Robert J. Baumler, both of Waseca, Minn.

[73] Assignee: E. F. Johnson Company, Minneapolis, Minn.

[21] Appl. No.: 598,558

[22] Filed: July 24, 1975

[51] Int. Cl.² .............................................. H01G 5/06
[52] U.S. Cl. ..................................... 361/293; 361/287
[58] Field of Search ........................ 317/249 R, 249 D

[56] References Cited

U.S. PATENT DOCUMENTS

| | | | |
|---|---|---|---|
| 2,535,367 | 12/1950 | Minnium | 317/249 D |
| 2,745,993 | 5/1956 | Foster | 317/249 R |
| 3,205,417 | 9/1965 | Maeda | 317/249 D |
| 3,500,147 | 3/1970 | Hirschberg | 317/249 R |
| 3,656,033 | 4/1972 | Nickles | 317/249 D |
| 3,701,932 | 10/1972 | Johanson | 317/249 D |

OTHER PUBLICATIONS

APC Application of Willwacher S.N. 398524, Published May 18, 1943.

*Primary Examiner*—E. A. Goldberg
*Attorney, Agent, or Firm*—Warren A. Sturm; James R. Haller; Hugh D. Jaeger

[57] ABSTRACT

A variable capacitor having a ceramic stator with a flat major surface for engaging a flat conductive rotor plate mounted on a shaft extending through the stator. The other major surface of the stator has a transverse slot having a capacitance forming electrode over the bottom portion that is substantially parallel to the flat major surface. A spring biased rotor terminal is affixed to the end of the shaft extending through the stator.

7 Claims, 7 Drawing Figures

U.S. Patent  Aug. 2, 1977  4,039,906
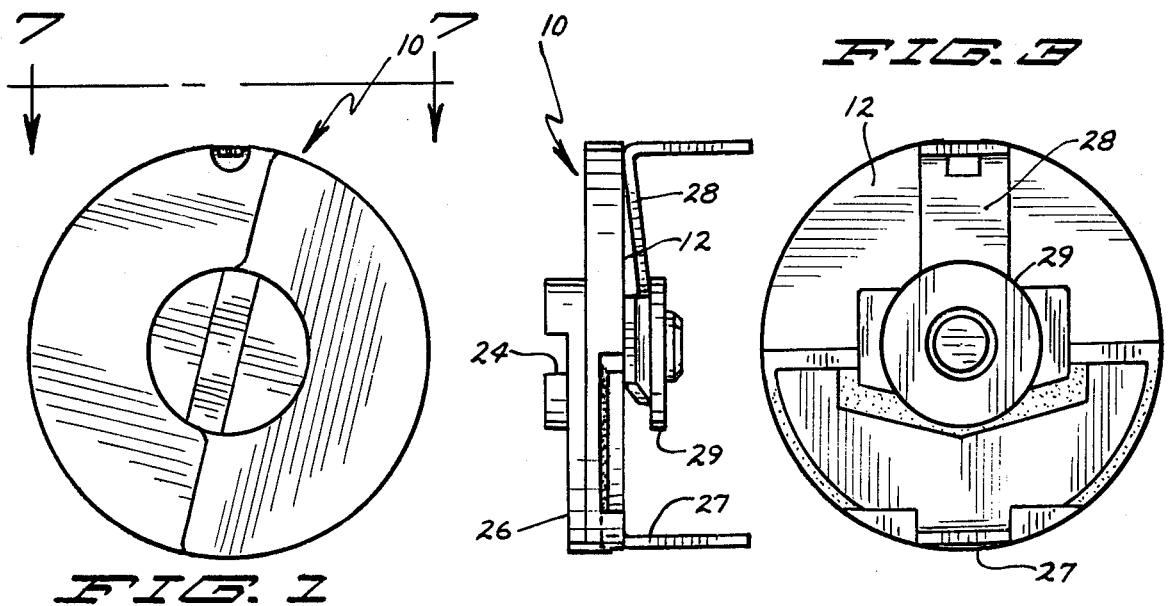
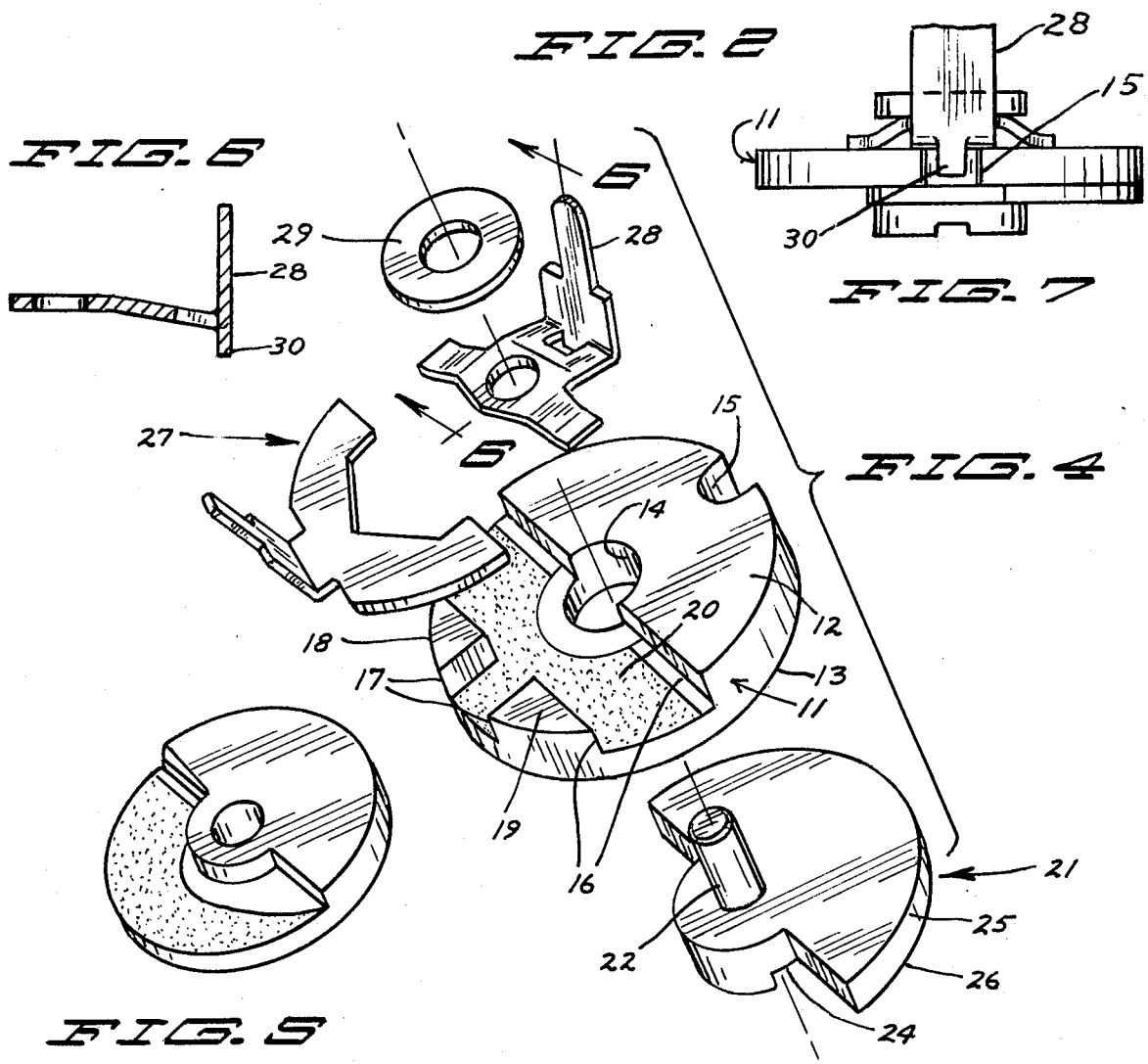

VARIABLE CAPACITOR

BACKGROUND OF THE INVENTION

This invention relates to variable capacitors and is particularly directed to a variable trimmer capacitor of the type having a ceramic stator carrying a first capacitance forming plate and a rotor, including a second capacity forming plate that is rotatably mounted on the stator.

SUMMARY OF THE INVENTION

In accordance with the present invention, the elements combined to form an improved, efficient, uncomplicated, inexpensive unit comprised of only two portions which require any dimensional relationship of close tolerance.

The capacitor of our invention is formed by the method of fabricating a stator of dielectric material, such as ceramic by common process, such as molding to have a shape so that a bottom surface is essentially flat and the top surface contains a recess adjacent an aperture extendng from the bottom to the top surface and the recess is extendant over an area of less than one-half of the surface of the top. A capacitance forming layer is disposed on the bottom of the resess, or slot, to form one electrode of a capacitor. The stator is easily lapped to provide an absolutely flat bottom surface. A conductive rotor containing a second capacitance forming plate is fabricated with an integral shaft extending from one side and the surface adjacent the shaft is fabricated so as to be essentially flat as the lower surface of the stator. The shaft extends through the aperture in the stator and through an aperture in a terminal assembly which is formed of material exhibiting resilient characteristics so that when a washer, or the like, as staked on the end of the shaft after the terminal has been disposed on the shaft, a biasing force is exerted on the shaft of the rotor so as to maintain it in intimate contact with the flat bottom surface of the stator. A further electrode for connection to other electronic components may be attached to the electrode deposited on the bottom of the recess in the stator to complete the assembly.

The method of fabricating the elements of our capacitor reduces to a minimum the steps which may be held to a close tolerance. The resulting device may be easily fabricated to provide different forms of characterization of the change of capacity intermediate the plates or electrodes by modifying the shape of the electrode material applied to the bottom of the recess or by changing the shape of the recess itself.

BRIEF DESCRIPTION OF THE DRAWINGS

FIG. 1 is a top plan view of a device illustrating the principles of our invention;

FIG. 2 is a side elevational view of FIG. 1;

FIG. 3 is a bottom view of an assembled capacitor;

FIG. 4 is an exploded view of the components of the capacitor of FIGS. 1, 2, and 3;

FIG. 5 shows an alternate form of stator which might be incorporated into the assembly resulting from FIG. 4;

FIG. 6 is a sectional view of a portion of FIG. 4 taken along section lines 5—5; and FIG. 7 is a further side elevation view of FIG. 1 taken along section line 7—7.

DESCRIPTION OF THE PREFERRED EMBODIMENT

Referring now to the drawings and specifically FIGS. 1 through 4, 6 and 7, a variable capacitor is indicated generally by reference character 10 and includes a stator 11, a rotor 21 and a pair of terminals 27 and 28. Stator 11 is comprised of a suitable ceramic dielectric material and may be fabricated by a molding process to have a top surface 12 and a bottom surface 13 and an aperture 14 extending between them. An axial groove 15 extends between the surfaces at one edge thereof and a transverse slot or recess 16 is shown extending between the sides of the stator 11 and includes a further portion in the form of a notch indicated by references 17 that is disposed between a pair of lands or ears 18 and 19. A suitable layer of metalized material is formed on the bottom of the slot or recess. It will be noticed that the bottom of the slot or recess is essentially parallel to bottom surface 13 and that the thickness of stator 11 may be in the magnitude of 20 to 22 mills between the top and bottom surfaces and 10–12 mills between the bottom of the slot or recess and the bottom surface. Capacitance forming plate 20 may be suitably fabricated by coating the bottom of the slot or recess with a metalized silver paste which is then fired to form the capacitance forming plate. It may be noticed that less than one-half of the top surface is removed to form the slot and notch, or recess 16 so that when it is desired to form an essentially flat bottom surface, there is sufficient material to allow easy lapping of the bottom surface of stator 11.

Rotor 21 which is unitary includes an axially extending shaft 22 and includes a radially extending portion adjacent one end that has a top surface 25 and a bottom surface 26. A transverse slot 24 is disposed on the other end of rotor 21 for adjustment by a suitable tool, such as a screwdriver. Rotor 21 is suitably fabricated so that top surface 25 is essentially flat and extends normal to the axis of shaft 22.

When assembled, shaft 22 is inserted through aperture 14 in stator 11 and a rotor terminal 28 comprised of material exhibiting suitable resilience characteristics is disposed over shaft 22 and held in place by a washer 29 that may be suitably staked on the top end of shaft 22 to maintain secure contact and effect a biasing force tending to pull rotor 21 toward stator 11 to maintain the desired close contact between bottom surface 13 and top surface 25. Terminal 28 is also provided with a downwardly extending portion, as at the right end of FIG. 6 and in the middle of FIG. 7 to engage axial groove 15 in stator 11 to prevent any tendency of terminal 28 to turn as rotor 21 is turned to effect capacitance changes through rotation with respect to stator 11. A further stator terminal 27 may be conveniently soldered to the top surface of electrode 20 on the bottom of transverse slot, or recess 16 and, in the embodiment of FIGS. 1–4, contains a portion that extends through notch 17 so as to resist any forces which might be applied to terminal 27 and tend to loosen its contact with the capacitance forming plate deposited on the bottom of recess 16.

FIG. 5 illustrates an alternative form of stator that might be employed to provide a desired characterization by suitably shaping the capacitance forming plate in accordance with the desired result. It should be noted that FIG. 5 also provides a top surface that is of greater thickness over substantially more than half of its area so as to provide a suitable surface for the lapping step of the bottom surface.

Having now therefore fully illustrated and described our invention, what we claim to be new and desire to protect by Letters Patent is:

1. A variable capacitor comprising in combination:
   an axial unitary conductive rotor including a shaft portion at one axial end and a radially extending capacitance forming portion at the other axial end, said capacitance forming portion having a flat surface extending normally to the longitudinal axis of said shaft adjacent said shaft portion;
   a stator comprised of material exhibiting dielectric characteristics, said stator having a flat major surface and an aperture extending therethrough to the other surface thereof to rotatably receive the shaft of said rotor, said stator further having a recess in the major surface thereof opposite to the stator flat major surface and opposite to the capacitance forming portion of said rotor, said recess extending laterally thereacross for less than one-half of the dimension of the other major surfaces of said stator receiving a capacitance forming electrode; and
   first and second terminals conductively connected to the shaft of said rotor and said capacitance forming electrode respectively.

2. The apparatus of claim 1 in which the recess in the major surface of said stator is of a lateral dimension configured to characterize the capacitance of the capacitor as said rotor is moved rotatably relative to the stator.

3. The apparatus of claim 1 in which the terminal for the rotor includes an axially extending portion disposed in an axial groove in the stator.

4. The apparatus of claim 1 in which the terminal connected to the capacitance forming electrode includes a portion substantially the same size as the recess in the major surface of said stator.

5. The apparatus of claim 2 in which the terminal for the rotor includes an axial extending portion disposed in an axial groove in the stator.

6. The apparatus of claim 1 in which the terminal connected to the capacitance forming electrode portion including a substantial portion in the recess in the major surface of said stator.

7. A variable capacitor comprising in combination:
   and axial unitary conductive rotor including a shaft portion at one axial end and a radially extending capacitance forming portion at the other axial end, said capacitance forming portion having a flat surface extending normally to the longitudinal axis of said shaft adjacent said shaft portion;
   a stator comprised of material exhibiting dielectric characteristics, said stator having a flat major surface and an aperture extending therethrough to the other surface thereof to rotatably receive the shaft of said rotor, said stator further having a recess in the major surface thereof opposite to the stator flat major surface and opposite the capacitance forming portion of said rotor, said recess extending laterally thereacross for less than one-half of the dimension of the other major surfaces of said stator receiving a capacitance forming electrode, and said recess of a lateral dimension configured to characterize the capacitance of the capacitor as said rotor is moved rotatably relative to the stator; and first terminal conductively connected to the shaft of said rotor including an axially extending portion disposed in an axial groove in the stator and second terminal connected to the capacitance forming electrode includes a portion substantially the same size as and the substantial portion in the recess in the major surface of said stator.

* * * * *

UNITED STATES PATENT OFFICE
CERTIFICATE OF CORRECTION

Patent No. 4,039,906    Dated August 2, 1977

Inventor(s) Chander M. Wahi et al.

It is certified that error appears in the above-identified patent and that said Letters Patent are hereby corrected as shown below:

Claim 7, line 2, "and" should read -- an --.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*